(12) United States Patent
Ljung et al.

(10) Patent No.: US 11,798,293 B2
(45) Date of Patent: Oct. 24, 2023

(54) OPTICAL VEHICLE POSITIONING

(71) Applicant: Sony Mobile Communications Inc., Tokyo (JP)

(72) Inventors: Peter Ljung, Lund (SE); Hannes Bergkvist, Helsingborg (SE); Jim Rasmusson, Lund (SE); Johan Wadman, Lund (SE); Magnus Ingelsten, Barsebäck (SE); Ivar Bergkvist, Lund (SE)

(73) Assignee: Sony Group Corporation, Tokyo (JP)

( * ) Notice: Subject to any disclaimer, the term of this patent is extended or adjusted under 35 U.S.C. 154(b) by 496 days.

(21) Appl. No.: 16/727,435

(22) Filed: Dec. 26, 2019

(65) Prior Publication Data
US 2020/0210719 A1 Jul. 2, 2020

(30) Foreign Application Priority Data

Dec. 28, 2018 (SE) .................... 1830389-1

(51) Int. Cl.
*G06V 20/56* (2022.01)
*G01C 21/20* (2006.01)
(Continued)

(52) U.S. Cl.
CPC ......... *G06V 20/588* (2022.01); *G01C 21/206* (2013.01); *G06V 20/30* (2022.01); *H04N 23/54* (2023.01); *G06V 2201/06* (2022.01)

(58) Field of Classification Search
CPC .. G06V 20/588; G06V 20/30; G06V 2201/06; G01C 21/206; H04N 5/2253
(Continued)

(56) References Cited

U.S. PATENT DOCUMENTS

| 4,908,557 A * | 3/1990 | Sudare ................ G05D 1/0261 318/587 |
| 2008/0027591 A1 | 1/2008 | Lenser et al. |

(Continued)

FOREIGN PATENT DOCUMENTS

| JP | 2013-147301 A | 8/2013 |
| JP | 2013147301 A | 8/2013 |

(Continued)

OTHER PUBLICATIONS

Swedish Search Report for corresponding Swedish Patent Application No. 1830389-1 dated May 28, 2019.
(Continued)

*Primary Examiner* — Matthew David Kim
(74) *Attorney, Agent, or Firm* — Renner, Otto, Boisselle & Sklar, LLP (57) ABSTRACT

A device, system and method for determining a position of a movable object on a two-dimensional surface obtains, via an image capture device attached to the movable object, at least one image of a portion of the two-dimensional surface. At one virtual marker is identified in at least one image, and a previously determined estimated position of the at least one virtual marker is retrieved. The previously determined estimated position determined from a combination of an image of at least one anchor point on the two-dimensional surface, the at least one anchor point defining a unique position on the two-dimensional surface, and odometry measurements based on at least two images of the two-dimensional surface. The position of the movable object on the two-dimensional surface is determined from the estimated position of the at least one virtual marker.

19 Claims, 4 Drawing Sheets

(51) Int. Cl.
*G06V 20/30* (2022.01)
*H04N 23/54* (2023.01)
(58) Field of Classification Search
USPC .......................................................... 701/501
See application file for complete search history.

(56) References Cited

U.S. PATENT DOCUMENTS

| | | |
|---|---|---|
| 2010/0223031 A1 | 9/2010 | Vincent et al. |
| 2012/0323431 A1 | 12/2012 | Wong et al. |
| 2014/0005933 A1 | 1/2014 | Fong et al. |
| 2014/0139654 A1* | 5/2014 | Takahashi ............ G06V 10/245 |
| | | 348/61 |
| 2018/0024562 A1 | 1/2018 | Bellaiche |
| 2018/0047147 A1 | 2/2018 | Viswanathan |
| 2018/0073891 A1 | 3/2018 | Max et al. |
| 2018/0112997 A1 | 4/2018 | Fasola et al. |
| 2018/0217600 A1* | 8/2018 | Shashua ................ G05D 1/0246 |
| 2018/0247429 A1* | 8/2018 | Chandraker ............. G06T 7/277 |
| 2018/0358842 A1* | 12/2018 | Kanno ..................... H02J 50/05 |
| 2019/0250614 A1* | 8/2019 | Ito ......................... G05D 1/0212 |
| 2020/0098135 A1* | 3/2020 | Ganjineh ................... G06T 7/74 |

FOREIGN PATENT DOCUMENTS

| | | |
|---|---|---|
| KR | 10-2011-049567 A | 5/2011 |
| KR | 20110049567 A | 5/2011 |
| WO | 2007/109624 A2 | 9/2007 |
| WO | 2016/130719 A2 | 8/2016 |
| WO | 2018/027206 A1 | 2/2018 |

OTHER PUBLICATIONS

Partial European Search Report for corresponding European Patent Application No. 19220023.6 dated May 12, 2020.

* cited by examiner

OPTICAL VEHICLE POSITIONING

This application claims priority to Swedish Patent Application No. 1830389-1 filed on Dec. 28, 2018, which is hereby incorporated herein by reference.

FIELD OF INVENTION

The present invention relates generally to position detection and, more particularly, to a vehicle position detection system, device and method utilizing optical detection techniques to determine an absolute position of a movable object on a two-dimensional surface.

BACKGROUND OF THE INVENTION

Positioning of one or more vehicles can be particularly difficult in an indoor or predefined industrial environment. For example, received strength signal indication (RSSI)-based solutions are inaccurate and sensitive to different and changing environments, particularly in environments that contain significant metal structures, while round trip-based time of flight-based solution are not power efficient and do not scale well. Other solutions, such as time of arrival-based solutions require nanosecond time synchronization accuracy, which is often hard or impossible to achieve, while angle of arrival-based solutions are complicated to install, are expensive, and require large multi-antenna anchor devices that tend to be sensitive to noise typically found in industrial environments.

Another difficulty in industrial environments is that often it is inconvenient to install a positioning infrastructure (e.g., anchor points) that require power or regular battery replacement. Further, industrial environments are often large which adds significant cost for infrastructure.

SUMMARY OF THE INVENTION

A system, device and method in accordance with the present invention utilize multiple techniques to identify a position of a movable object on a two-dimensional surface. More particularly, anchor points are arranged on the two-dimensional surface, the anchor points including information that can be used to uniquely define the position of the anchor point on the two-dimensional surface. A movable object, such as a fork lift, autonomous vehicle, robot, or the like, includes an image capture device, such as a camera or the like, attached thereto, the image capture device operative to capture images of the two-dimensional surface. The captured images are analyzed to determine the unique position of the anchor points. Further, odometry measurements can be performed based on multiple images of the two-dimensional surface to determine a change in position of the movable object with respect to an anchor point that is no longer in the field of view of the image capture device.

To further enhance position accuracy, virtual markers, such as wear patterns on the two-dimensional surface, structures fixed to the two-dimensional surface, irregularities in the two-dimensional surface, etc., are defined on the two-dimensional surface, and the position of the virtual markers is determined from the location of the anchor points and the odometry measurements. The position of each virtual marker is stored, for example, in a database that is accessible by other movable objects on the two-dimensional surface. Collaborative optimization then can be performed on the stored locations of each virtual marker where, for example, other movable objects update the location of the virtual markers, thus increasing the accuracy of these virtual markers.

According to one aspect of the invention, a method for determining a position of a movable object on a two-dimensional surface includes: obtaining, via an image capture device attached to the movable object, at least one image of a portion of the two-dimensional surface; identifying in the at least one image at least one virtual marker; retrieving a previously determined estimated position of the at least one virtual marker, said previously determined estimated position determined from a combination of i) an image of at least one anchor point on the two-dimensional surface, the at least one anchor point defining a unique position on the two-dimensional surface, and ii) odometry measurements based on at least two images of the two-dimensional surface; and determining the position of the movable object on the two-dimensional surface from the estimated position of the at least one virtual marker.

Optionally, the method includes sharing the estimated position of the at least one virtual marker with other movable objects operating on the two-dimensional surface.

Optionally, the method includes updating the estimated position of the at least one virtual marker based on position data related to the at least one virtual marker from at least one other movable object on the two-dimensional surface.

Optionally, the method includes prior to retrieving the previously determined estimated position of the at least one virtual marker, identifying at least one image of a plurality of images that includes an anchor point; determining an anchor position from the identified image of the anchor point; determining the estimated position of the at least one virtual marker based on the anchor position and the odometry measurements.

Optionally, the odometry measurements are based on at least two different images of the at least one virtual marker to identify a change in position of the movable object relative to the anchor point.

Optionally, the method includes using homography to perform the odometry measurements.

Optionally, identifying at least one image of the plurality of images that includes at least one virtual marker includes defining the at least one virtual marker from features of the two-dimensional surface.

Optionally, defining the at least one virtual marker from features of the two-dimensional surface includes defining the at least one virtual marker from variations in the two-dimensional surface, or from wear patterns in the two-dimensional surface, or from objects fixed to the two-dimensional surface.

Optionally, each anchor point is encoded with position data that defines a unique two-dimensional position on the two-dimensional surface.

According to another aspect of the invention, a movable object configured to travel along a prescribed two-dimensional surface includes: an image capture device; and a controller communicatively coupled to the image capture device and operative to receive image data therefrom, wherein the controller is configured to: obtain, via the image capture device, at least one image of a portion of the two-dimensional surface; identify in the at least one image at least one virtual marker; retrieve a previously determined estimated position of the at least one virtual marker, said previously determined estimated position determined from a combination of i) an image of at least one anchor point on the two-dimensional surface, the at least one anchor point defining a unique position on the two-dimensional surface, and ii) odometry measurements based on at least two images of the two-dimensional surface; and determine the position of the movable object on the two-dimensional surface from the estimated position of the at least one virtual marker.

Optionally, the movable object includes a support structure including a plurality of wheels, wherein said image capture device is attached to said support structure; and a prime mover arranged on the support structure and drivingly coupled to the plurality of wheels to effect motion of the movable object.

Optionally, prior to retrieving the previously determined estimated position of the at least one virtual marker, the controller is configured to: identify at least one image of the plurality of images that includes an anchor point; determine an anchor position from the identified image of the anchor point; determine the estimated position of the at least one virtual marker based on the anchor position and the odometry measurements; and store the estimated position of the at least one virtual marker.

Optionally, the controller is configured to base the odometry measurements on at least two different images of the at least one virtual marker to identify a change in position of the movable object relative to the anchor point.

Optionally, the controller is configured to define the at least one virtual marker from features of the two-dimensional surface.

Optionally, the controller is configured to define the at least one virtual marker from variations in the two-dimensional surface, from wear patterns in the two-dimensional surface, or from objects fixed to the two-dimensional surface.

According to another aspect of the invention, a system for navigating a movable object on a prescribed two-dimensional surface includes: at least one anchor point arrangeable on the two-dimensional surface, the at least one anchor point including information defining a unique anchor position of the anchor point on the two-dimensional surface; and the movable object as described herein.

Optionally, the at least one anchor point comprises at least one of a label attachable to the two-dimensional surface, an image projectable onto the two-dimensional surface, an image painted on the two-dimensional surface, a QR code, a bar code or a natural feature formed on the two-dimensional surface.

Optionally, the system includes a plurality of movable objects according to claim 10, wherein each movable object of the plurality of movable objects is configured to share locations of the at least one virtual marker with other movable objects of the plurality of movable objects.

According to another aspect of the invention, a non-transitory computer-readable medium comprising computer executable instructions which when executed by a processor cause the processor to perform the steps as described herein.

According to another aspect of the invention, a method for defining a position of at least one virtual marker on a prescribed two-dimensional surface includes: obtaining, via an image capture device attached to a movable object traveling on the two-dimensional surface, a plurality of images of a portion of the two-dimensional surface; identifying at least one image of the plurality of images that includes an anchor point that defines a unique position on the two-dimensional surface; determining an anchor position from the identified image of the anchor point; defining at least one virtual marker in at least one of the plurality of images; performing odometry measurements to determine a change in position of the movable object between capture of the image of the anchor point and capture of the image of the at least one virtual marker, and assigning an estimated position to the at least one virtual marker based on the anchor position and the odometry measurements.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

The present invention finds utility in indoor fork lift positioning systems and thus will be described chiefly in this context. However, aspects of the invention are also applicable to other systems, including other types of vehicles, autonomous vehicles, robots and the like.

Embodiments of the present invention will now be described with reference to the drawings, wherein like reference numerals are used to refer to like elements throughout. It will be understood that the figures are not necessarily to scale.

A system, device and method in accordance with the invention enable an absolute position of a movable object, such as fork lift, an autonomous vehicle, a robot, or the like, to be determined in an environment, such as an industrial environment. More specifically, the system, device and method in accordance with the invention utilize multiple layers of position information to accurately determine the position of the movable object. In this regard, the system, device and method in accordance with the invention are based around an image capture device installed on the movable object, where the image capture device at least periodically captures an image of the two-dimensional surface.

A first positioning layer detects fixed visual anchor points (markers) that are located on the floor of the environment. In this manner, the absolute position of the movable object can be determined based on an image of the anchor point as obtained by the image capture device. For example, an image of anchor points on the floor may be obtained by the fixed image capture device, and the image may be analyzed to not only determine which marker the movable object is near, but also extract or otherwise obtain position information from the anchor point. Such information, for example, may be embedded within the anchor point or stored in a database. Further, a position of the movable object relative to the anchor point can also be determined from the captured image, and these two pieces of data can be used to determine the absolute position of the movable object in real time. Such approach can provide accuracy within one centimeter or less.

As used herein, an anchor point is defined as a marker or the like that includes or has associated therewith an absolute (non-ambiguous) position for the marker on the two-dimensional surface. Further, as used herein a virtual marker is defined as a feature of the two-dimensional surface that has not been predefined.

The anchor points can be implemented in different ways. For example, markers may be placed on the floor (e.g., via an adhesive label or painted on the floor), formed into the floor, or projected on to the floor (e.g., via a laser projector). These markers may take various forms. In one embodiment, the markers may be QR (quick response) code markers, bar code markers, etc. that are uniquely identifiable from one another. The markers only need to be unique in the local surroundings so the number of different markers can optionally be low.

A positioning solution only based on anchor points, however, may in some cases not be practical. For example, depending on the specific application a large number of anchor points may need to be deployed on the floor, which presents a potential maintenance issue (e.g., since the anchor points are on the floor, they may experience wear from traffic over the anchor points). Further, and as will be appreciated, it may not be practical to provide such anchor points at locations such that at least one anchor point is always in the field of view of the image capture device. As a consequence, if an anchor point is not detected in the captured image (e.g., due to wear or due to not being in the field of view of the camera) it may not be possible to determine the position of the movable object.

To address this issue, the system, device and method in accordance with the invention include support for relative positioning when markers cannot be seen. In this regard, relative movement estimation (relative movement between markers) can be implemented using visual odometry based on multiple images. There are many known methods of visual odometry; monocular and stereo, feature based and direct. A monocular/stereo feature method concerns whether depth information can be obtained. If the height of the image capture device relative to the two-dimensional surface is known, then depth information is not typically needed and monocular feature method will suffice. However, if the height is not known, then the stereo feature method may be used. Regarding direct/feature-based odometry method, this relates to whether relative movement between images is directly determined from the whole image data or indirectly determined using a first step where features are extracted from the images and then relative feature movement is determined from the extracted features. Feature extraction (as a first step), which can be referred to as an indirect odometry method, can be advantageous as it typically is less computationally intensive. In one embodiment of the device an method in accordance with the invention, a monocular feature method is utilized. In another embodiment, a direct based method is utilized. As these methods are known they are not described in detail herein.

In a preferred configuration, the image capture device is arranged at a fixed height above the floor so distance estimation is not needed (and thus the less computationally-intensive indirect odometry method can be utilized). Relative movement between different images can also be found by determining the homography between subsequent images. The homography between two images describes how two images are projected to the camera due to movement of the camera. The movement (rotation, translation, scaling) is captured in a homography matrix, which is determined from the changed positions of the same set of features in each image. From the homography matrix the exact movement of the camera in three-dimensions can be determined.

An advantage of using visual odometry for relative positioning is it can allow for the use of fewer pre-installed anchor points. The use of relative positioning, however, may introduce a position error that accumulates as a function of the distance travelled. To keep the maximum positioning error below a certain limit, it is preferable that the maximum distance between anchor points is maintained to be within a predefined distance.

Further, to enhance position accuracy virtual markers may be created from optical features (e.g., natural features) in the floor. At any point in time, the vehicle has an estimated position (based on anchor point detection and relative (odometry) positioning). As part of the visual odometry algorithm, visual features can be extracted and mapped to their estimated location in a feature map (database) along with estimated locations of the visual features. In almost every practical environment the floor has a number of detectable features. For instance, a typical industrial floor may have substantial variation on the concrete as well as wear patterns due to use of the floor. Patterns in the floor caused by repeated travel, defects in the floor, physical objects attached to the floor, etc. can be used to define a virtual marker that, based on a known position of an anchor point in combination with visual odometry, can have associated therewith a position. Using this database of extracted virtual markers and estimated locations, a direct position (with a known accuracy) can be directly extracted when this feature is detected again.

Calculation of a more accurate location from several location estimates (of the same feature on the floor) can be achieved by common statistical methods. Each location measurement can be used to create a probability model for the accurate location given the measurement. The probability model for a set of measurements, are these models combined, which in turn can be used to calculate a more accurate probability model.

According to one embodiment, a pattern can be applied to the floor to make actual features in the floor easier to detect and/or to create features in the floor. The pattern, for example, can be a random or repeating pattern. A random (non-repeating) pattern is advantageous over a repeating pattern, as it may not be possible and/or difficult to determine an absolute location when using a repeating pattern. Such features could be painted on the floor or projected (e.g., by laser) on the floor. In this manner, floors with non-detectable natural features can easily be modified to provide optimal results. The floor pattern could even be "painted" as part of the positioning system. For example, a short-pulse laser could apply "heat dots" on the floor that may be detected by an infrared camera. In one embodiment the heat dots are used for relative positioning (in the same manner as natural features in the floor). In another embodiment, heat dots may be used as virtual features with known position. The system can "paint" a heat marker (possibly outside of camera view) with a known position relative to the current known position. When this marker is detected the known position can be retrieved just like another virtual marker. The image detection hardware and position algorithms can be designed to be very efficient for such application.

If the position as determined from a virtual marker has an error that is less than a position determined from relative movement from a last pre-defined anchor point, the virtual marker position can be used to minimize the positioning error. In this regard, it is possible to determine the amount in which the estimation error increases by movement in a unit distance (e.g., per meter). For example, when moving between two anchor points it is possible to determine the total estimation error made between the two anchor points (e.g., based on the odometry measurements and the retrieved position of the anchor points). This estimation error then can be divided by the total travelled distance to obtain the estimation error per unit distance. Thus, the accuracy can be roughly known and directly dependent on the travelled distance from an anchor point or virtual maker. Advantageously, this further decreases the number of required pre-installed anchor points while keeping the accuracy high.

In detecting virtual markers, different image feature extraction methods (possibly shared from visual odometry) may be utilized, e.g., scale invariant feature transform (SIFT), speed up robust feature (SURF), robust independent elementary features (BRIEF) and oriented FAST, rotated BRIEF (ORB), etc. These feature extraction methods are well known and thus are not described in detail herein. It is noted, however, that feature extraction in two dimensions is simpler than feature extraction in three dimensions. Therefore, the use of two-dimensional extraction methods is advantageous over three-dimensional extraction methods in that less processing power is required to perform the extraction. The excess available processing power then may be used for other subsystems, thus enhancing overall performance.

Conventionally, image feature extraction algorithms are adapted for three-dimensional location detection. Because the system, device and method in accordance with the invention can utilize two-dimensional image data, the set of features found in a first image is also found in second image. Features cannot be hidden on a two-dimensional plane, which means that the set of features can be combined as "super features" (i.e., multiple features combined to define a more-detailed feature). It is also easy to determine if similar features in two images match by looking at the set of features around the feature of interest. Features (or super features) can also be selected as virtual markers (or super virtual markers) based on their uniqueness. Just as pre-defined markers are uniquely identifiable, virtual features should be selected to be as dissimilar as possible to other virtual features.

To further enhance position accuracy, the system, device and method in accordance with the invention can include an additional positioning layer that involves collaborative virtual feature extraction between multiple movable objects. For example, the location of virtual markers as determined by each movable object can be shared amongst other movable objects of the system. Thus, for example, if two different movable objects identify a location of the same virtual marker to be at coordinates different from another movable object, then the another movable object can update its database accordingly. Moreover, by combining feature extraction and estimated positioning from multiple movable objects operating in the system, the time to create an accurate feature map can be decreased.

Figure 1:
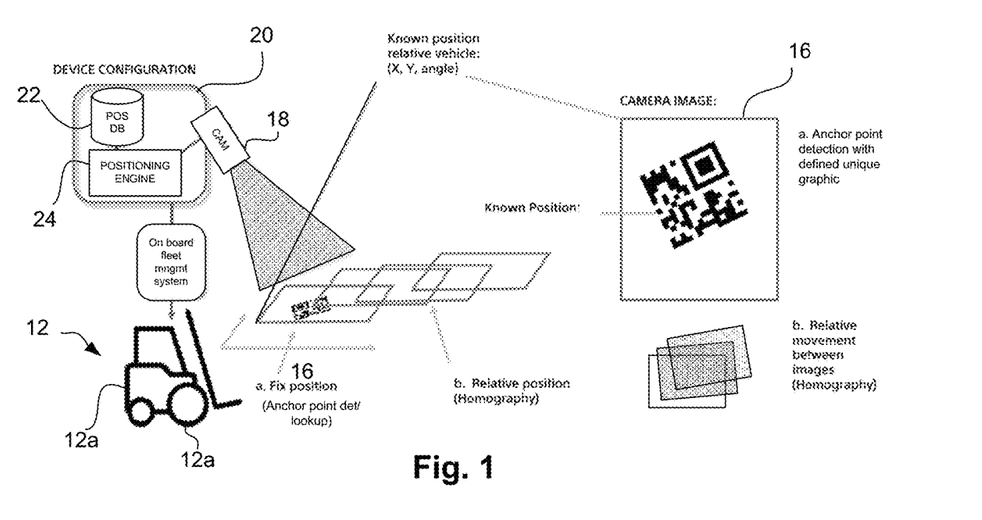
FIG. 1 is a schematic diagram illustrating principles of a position detection system in accordance with the present invention.
Figure 2:
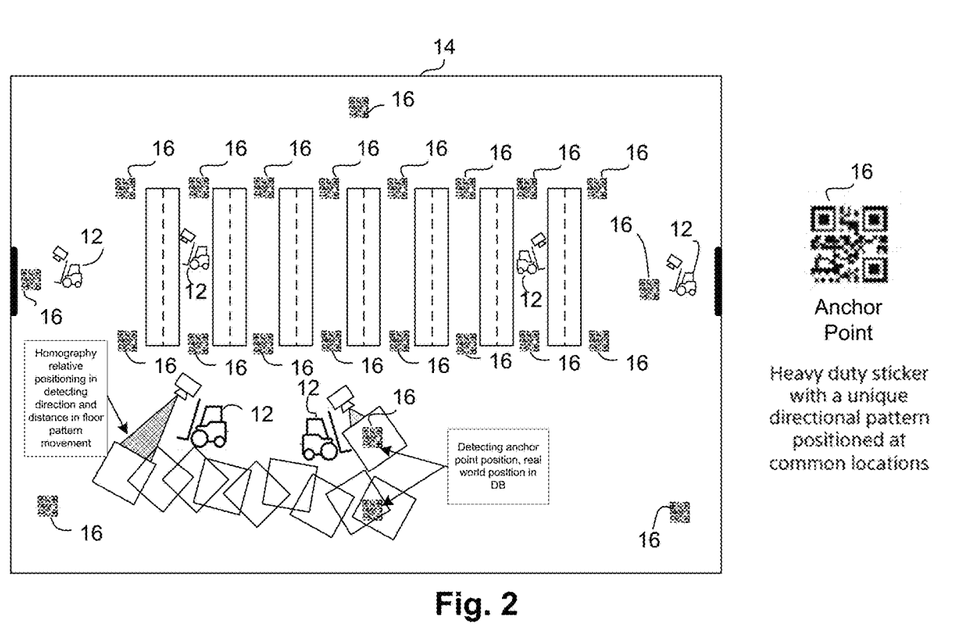
FIG. 2 is a schematic diagram of an operational position detection system according to an aspect of the present invention.

Referring now to FIGS. 1-2, illustrated are schematic diagram showing principles of a position detection system in accordance with the present invention. The exemplary system 10 includes a movable object 12, such as a fork lift, autonomous vehicle, robot, or the like, movable on a two-dimensional surface 14. Arranged on the two-dimensional surface is one and preferable a plurality of anchor points 16. Each anchor point 16 may optionally be encoded with position data (e.g., longitude, latitude, altitude, direction, etc.) that defines a unique two-dimensional position on the two-dimensional surface 14. Alternatively, the position data associated with each anchor point 16 may be stored in a database, where the position data is associated with a corresponding anchor point in the database.

In one embodiment, the anchor point is physically attached to the two-dimensional surface 14, e.g., the anchor point 16 is painted on the surface 14, attached to the surface via an adhesive (e.g., an adhesive label) or formed in the surface. In another embodiment, the anchor point is projected onto the two-dimensional surface 14. For example, a laser projector or the like may project one or more anchor points onto the two-dimensional surface 14. An advantage of projecting the anchor point 16 onto the two-dimensional surface 14 is that the location of an anchor point 16 can be easily changed, which may be beneficial in the event the floor layout is altered due to renovation or upgrades. The anchor point may take various forms, including, for example, a quick response (QR) code or a bar code.

The exemplary movable object 12 includes a support structure 12a having a plurality of wheels 12b attached thereto to enable motion of the movable object 12. Also attached to the support structure 12a is at least one image capture device 18. The image capture device 18 is communicatively coupled to a controller 20 and operative to provide image data to the controller 20. In one embodiment, the controller 20 includes a data store 22, such as a database or the like, for storing image data, such as image data corresponding to anchor points, virtual markers (discussed below), etc., and also for storing position data corresponding to the anchor points and virtual markers. In another embodiment, the data store 22 is located remote from and accessible by the controller 20. For example, the data store 22 may be stored on a server that is accessible by the controller 20.

The controller 20 also includes a positioning engine 24, which, as will be described in more detail below, is configured to implement the methods described herein to determine a position of the movable object 12 on the two-dimensional surface 14. In this regard, the position is based on an image obtained via the image capture device 18 of at least one anchor point 16 on the two-dimensional surface 14 along with odometry measurements and positions of virtual markers defined on the two-dimensional surface 14. Further, position data for virtual markers from at least one other movable object 12 and preferably multiple other movable objects can be shared amongst the movable objects 12. In this manner, the location of virtual markers can be continuously updated to enhance accuracy of the system.

Figure 3A:
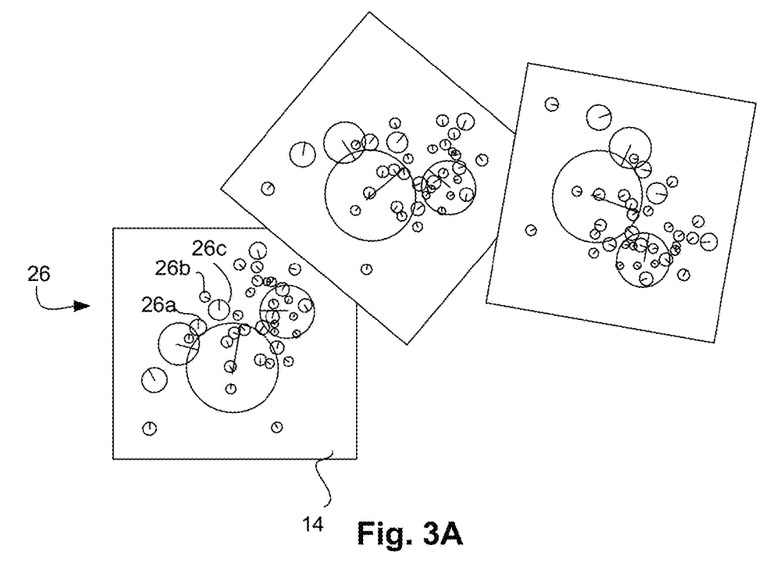
FIG. 3A illustrates virtual markers in a two-dimensional surface in accordance with an aspect of the present invention.
Figure 3B:
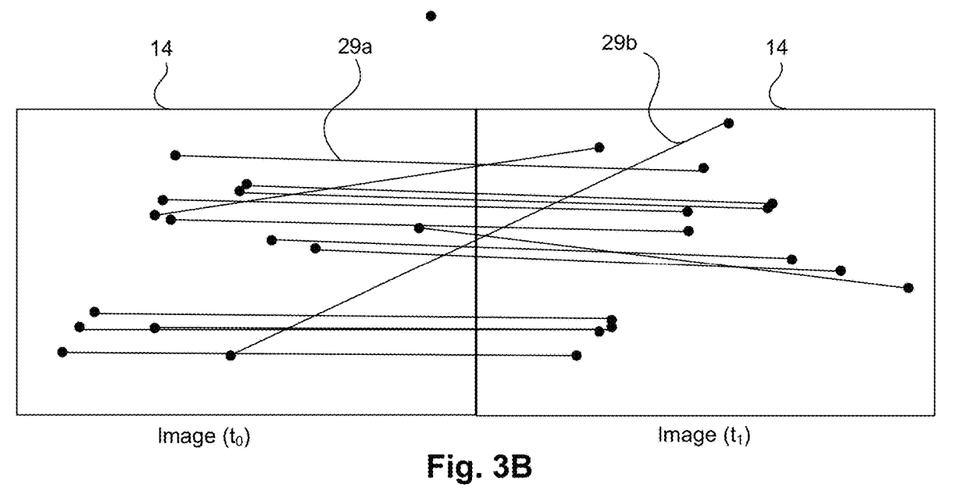
FIG. 3B illustrates valid (straight line) and invalid (diagonal line) virtual markers in subsequent images.

Referring briefly to FIG. 3A, illustrated is an exemplary image of a two-dimensional surface 14 showing exemplary features that can be used to define virtual markers 26, where different feature sizes are represented by different size circles. In FIG. 3A, the virtual markers 26 may be defined by a set of features in the surface, e.g., wear patterns, irregularities, etc. For example, in FIG. 3A the three features labeled 26a, 26b and 26c can be used to define a virtual marker 26. Super virtual markers may be defined by the combination of two or more virtual markers 26. Also, the features that define a virtual marker 26 (or the virtual markers 26 that define a super virtual marker) need not be immediately adjacent to one another and instead may be spread apart over the two-dimensional surface. FIG. 3A also illustrates images of the same features obtained from different locations of the movable object 12. The different images can be used to perform odometry measurements by analyzing a change in position of the virtual markers 26 and super virtual markers between images, where, for example, the odometry measurements can be based on homography. FIG. 3B illustrates a comparison between successive images of features, where the change in location of features that define a virtual marker is identified by comparing the two images. Straight line segments 29a between the same features in each image correspond to identification of valid feature match while diagonal line segments 29b correspond to identification of invalid feature match.

Figure 4:
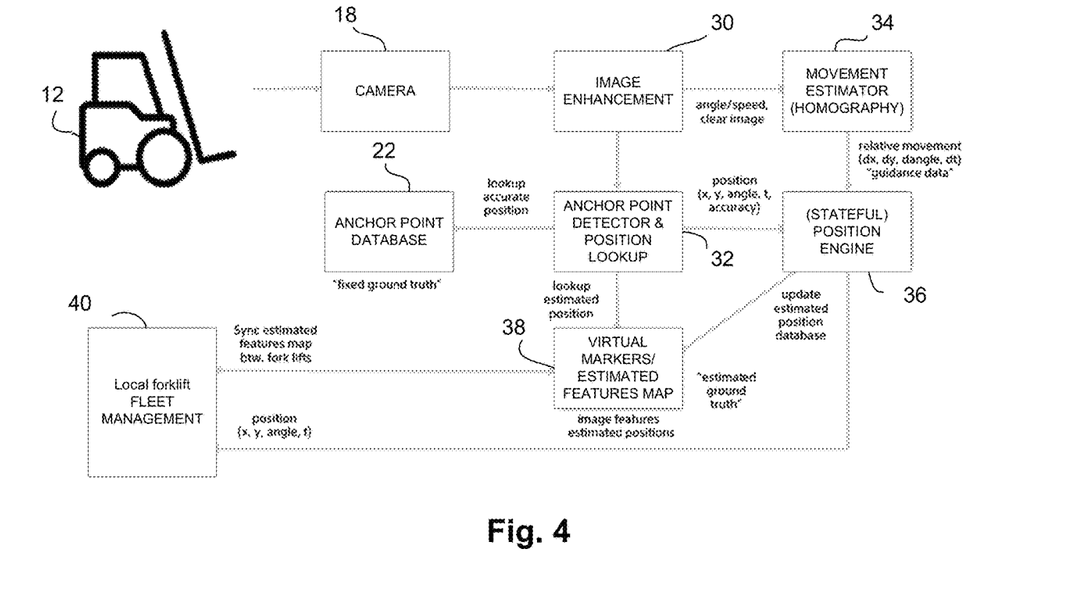
FIG. 4 is a block diagram illustrating modules of an exemplary positioning system according to an aspect of the present invention.

Referring now to FIG. 4, illustrated is a block diagram showing modules of an exemplary positioning system in accordance with the invention. As shown in FIG. 4, a movable object 12 includes an image capture device 18, such as a camera or the like, attached to the movable object 12. For a movable object embodied as a forklift, the image capture device 18 may be arranged at a height of 1-2 meters above the two-dimensional surface 14. In one embodiment, the image capture device 18 has a field of view that spans 2×2 meters, has at least one mega pixel resolution, a 100 Hz operation speed, and a 1 msec shutter speed. It will be appreciated, however, that other specifications may be used for the image capture device 18 depending on the specific application.

As used herein, the term "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code. Any other kind of implementation of the respective functions which will be described in more detail below may also be understood as a "circuit" in accordance with an alternative embodiment.

With continued reference to FIG. 4, an optional image enhancement circuit 30 is configured to improve image quality. This can include, for example, enhancing image contrast or normalizing the image for different light conditions, reducing image blur due to motion of the object 12 (and thus motion of the image capture device 18), etc. For example, as an image is captured by the image capture device 18 the movable object 12 may continue to move. As a result, the image capture device 18 also may move during the capture processes. Since the shutter is open for a prescribed time period to capture the image (e.g., 1 msec), motion during this period can cause the image to blur. The motion blur reduction circuit 30 can process image data from the image capture device 18 to reduce blur and output a compensated image.

Additionally, it is possible to use linear blur from the images (i.e., blurring of the captured image due to movement of the image capture device while capturing the image) to approximately detect the direction and speed of the movable object 12. The speed and direction information then can be used to optimize the odometry estimation. The speed and direction information may also be useful to take images with slower shutter speeds (in as subset of images) to obtain more accurate movement detection from the linear image blur.

The raw image data (from the image capture device) or the compensated image data (from the motion blur reduction circuit 30) is provided to a marker detector and position lookup circuit 32, which processes the image data to identify if an anchor point 16 is present in the captured image. In this regard, the marker detector and position lookup circuit 32 may utilize conventional image recognition techniques to identify an anchor point. Upon identifying an anchor point 16, position data encoded in the anchor point may be extracted, e.g., data stored in a bar code, a QR code, or the like, may be read from the image of the anchor point 16. Alternatively, the position data may be retrieved by searching a database 22 for the identified anchor point 16 and, upon finding a match, the position data associated with the stored anchor point 16 may be retrieved. In this manner, the system can determine the absolute position of the movable object 12 on the two-dimensional surface 14.

While the system can determine the absolute position based on anchor points, such anchor points may not always be in the field of view of the image capture device 18. To address the scenario where an anchor point 16 is not in the field of view of the image capture device 18, odometry measurements are performed to determine a change in position of the movable object 12 relative to the last detected anchor point 16. To perform such odometry measurements, the raw or compensated image data is provided to a movement estimator circuit 34. The movement estimator circuit 34 analyzes a plurality of images to determine a change in position of the movable object 12 relative to the last detected anchor point 16. The movement estimator circuit 34 may utilize one or more techniques to determine the change in position. For example, the movement estimator circuit 34 may employ a monocular feature method, a direct based method, or homography between subsequent images as referenced herein.

The odometry measurements made by the movement estimator circuit 34 and the anchor point 16 position provided by the marker detector and position lookup circuit 32 are provided to a position engine circuit 36. The position engine circuit 36 combines the data to determine the current position of the movable object 12. For example, based on a known position from an anchor point 16 and a known change in position relative to the anchor point 16 as determined from odometry measurements, the current position of the movable object 12 can be calculated.

As the movable object 12 travels along the two-dimensional surface, an estimated features map circuit 38 can define and retrieve virtual markers (e.g., wear patters, irregularities, fixed objects, etc.) corresponding to the two-dimensional surface 14. More particularly, characteristics of the surface 14 can be identified by the estimated features map circuit 38 and defined as a virtual marker 26 (or super virtual marker), and based on the current location of the movable object 12 as determined from the anchor points 16 and odometry measurements a position of the defined virtual marker 26 or super virtual marker can be stored in a database 22 along with the defined virtual marker. These virtual markers then can be used later to determine a position of the movable object 12 as well as shared amongst other movable objects 12.

The estimated features map circuit 38 also may compare the position of the movable object 12 (as determined from anchor points and odometry measurements) with the retrieved position of the virtual markers 26 to confirm that the position is valid. For example, if the position of the movable object 12 and the retrieved position of the virtual marker 26 are not within a predetermined tolerance of each other, then it can be concluded that a position error has occurred and a prescribed action taken, e.g., request maintenance. Additionally or alternatively, the position of the virtual maker 26 as stored in the database may be updated based on the position of the movable object 12. In this regard, a confidence level may be associated with the stored position of the virtual marker 26 e.g., if five other movable objects conclude the position is correct and one movable object concludes the position is incorrect, then it can be concluded with a level of confidence that the stored position is correct and the position as detected by the movable object is incorrect (low confidence) and should be updated based on the virtual marker position. Further, each time a movable object 12 detects a virtual marker 26 the position of the virtual marker may be stored in the database such that each virtual marker 26 has multiple positions associated therewith. The multiple positions can be averaged and set as the actual position of the virtual marker 26.

An optional fleet management circuit 40 obtains position data from the position engine circuit 36 and the estimated features map 38 to track each movable object 12 on the two-dimensional surface 14. The position of each movable object 12 then can be used to plan future positions for the movable object 12.

Figure 5:
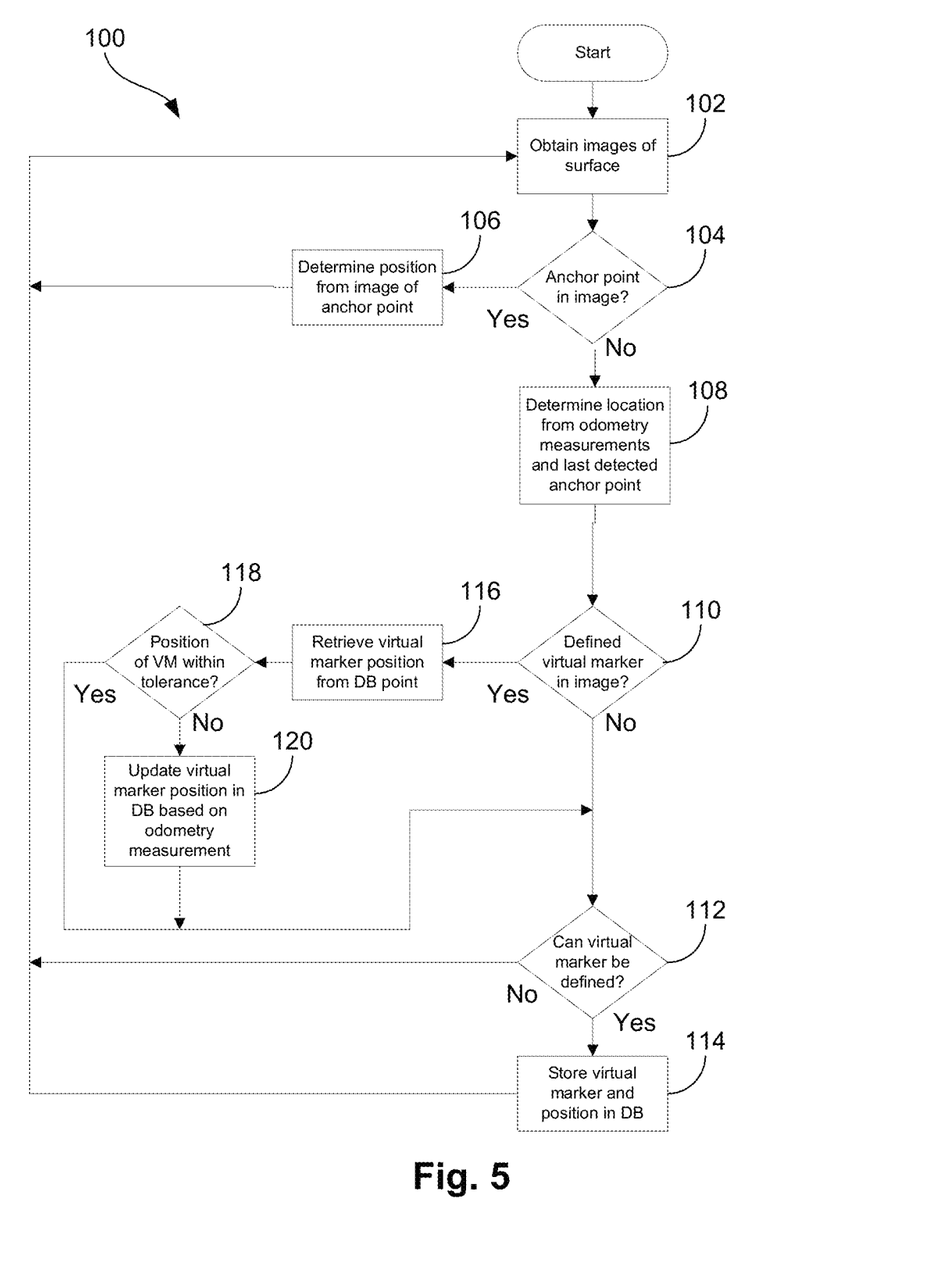
FIG. 5 is a flow diagram illustrating exemplary steps of a method in accordance with the invention.

Moving now to FIG. 5, illustrated is a flow chart 100 that provides exemplary steps for determining a position of a movable object 12 in accordance with the invention. The flow chart 100 includes a number of process blocks arranged in a particular order. As should be appreciated, many alternatives and equivalents to the illustrated steps may exist and such alternatives and equivalents are intended to fall with the scope of the claims appended hereto. Alternatives may involve carrying out additional steps or actions not specifically recited and/or shown, carrying out steps or actions in a different order from that recited and/or shown, and/or omitting recited and/or shown steps. Alternatives also include carrying out steps or actions concurrently or with partial concurrence.

Beginning at step 102, the image capture device 18, which is attached to the movable object 12, is used to obtain one or more images of a portion of the two-dimensional surface 14. Next at step 104 the image is analyzed to determine if the image includes an anchor point 16. The analysis may be implemented using conventional image recognition techniques as discussed herein. If an anchor point 16 is identified in the captured image, then the method moves to step 106 where a position of the anchor point 16 is determined. In one embodiment, the position of the anchor point 16 is encoded in the anchor point and, thus, the position can be determined directly from the captured image. In another embodiment, a database 22 is accesses and searched using the anchor point image as search criteria. Upon finding a match in the database 22 for the anchor point 16, position information associated with the anchor point 16 is retrieved from the database 22. The method then moves back to step 102 and repeats.

Moving back to step 104, if an anchor point 16 is not identified in the captured image, then the method moves to step 108 and the position of the movable object 12 is determined from the previously obtained anchor point position and from odometry measurements made since the last anchor point position was obtained. Next at step 110 it is determined if a defined virtual marker 26 is detected in the captured image. As discussed herein, a virtual marker 26 is a marker that is defined from characteristics of the two-dimensional surface 14, e.g., wear patterns in the surface, irregularities in the surface, objects fixed to the surface, etc. The virtual marker 26 may be identified in the captured image in the same manner as anchor points 16 are identified in the captured image. If a virtual marker 26 is not identified in the captured image, then the method moves to step 112, where it is determined if a virtual marker 26 can be defined in the two-dimensional surface 14. In making such determination, the controller 20 can analyze the two-dimensional surface 14 for characteristic features that are clearly and repeatably identifiable. If such features are not found, then the method moves back to step 102 and repeats. However, if such features are found in the captured image, then the method moves to step 114 where the characteristic features are defined as a virtual marker 26 and stored in the database 22 along with the position of the virtual marker 26. In this regard, the position of the virtual marker 26 is determined based on a position of an anchor point 16 (which was obtained via an image of the anchor point on the two-dimensional surface) and odometry measurements based on at least two images of the two-dimensional surface 14. The method then them moves back to step 102 and repeats.

Moving back to step 110, if a defined virtual marker 26 is detected in the captured image, the method moves to step 116 where the virtual marker 26 is used as search criteria in the database 22 and, upon finding a match, a previously determined estimated position of the virtual marker 26 as stored in the database 22 is retrieved. The position of the movable object 12 on the two-dimensional surface then can be determined from the estimated position of the virtual marker 26.

Next, sharing of the virtual marker position between multiple movable objects 12 may be performed. More specifically, at step 118 the controller 20 determines if the estimated position of the virtual marker 26 as stored in the database 22 corresponds to an expected position of the virtual marker 26 as determined from the anchor point 16 position and odometry measurements. For example, in one embodiment if the estimated position retrieved from the database 22 and the calculated position based on the anchor point 16 and odometry measurements are within a predetermined tolerance of one another, then the estimated position may be regarded as accurate and used as the position of the moveable device 12 and/or marked with a confidence level. The method then moves to step 112 as discussed above. However, if the estimated position retrieved from the database 22 and the calculated position based on the anchor point 16 and odometry measurements are not within a predetermined tolerance of one another, then it can be presumed one of the values is incorrect/out of tolerance. A decision then can be made to use the database value or the calculated value of the virtual maker 26. This decision can be based on the confidence associated with the value stored in the database 22.

For example, if the value stored in the database 22 has been found to be within tolerance by five other movable objects 12, then it may be concluded that the value stored in the database 22 is accurate and the error lies with the movable object that is currently accessing the database 22. However, if the location of the virtual marker 26 was only recently stored in the database 22 by one other movable object 12, then it may be uncertain which is more accurate. In such instance the controller 20 may use a combination of the two positions. Also, the controller 20 may update the position of the virtual marker 26 as stored in the database 22 so other movable objects may obtain the updated position. In this regard, the controller 20 may have a limited correction factor that can be applied to the value stored in the database 22, e.g., the controller 20 may not alter the stored position my more than a predetermined percentage or value. The method then moves to step 112 as discussed above.

FIG. 5 described above depicts exemplary flow diagram representative of process that may be implemented using, for example, computer readable instructions that may be used to determine a position of a movable object on a two-dimensional surface 14. The exemplary process may be performed using a processor, a controller and/or any other suitable processing device. For example, the exemplary process may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Some or all of the exemplary process may be implemented using any combination(s) of application specific integrated circuit(s) (ASIC(s)), programmable logic device(s) (PLD(s)), field programmable logic device(s) (FPLD(s)), discrete logic, hardware, firmware, and so on. For example, the order of execution of the blocks may be changed, and/or some of the blocks described may be changed, eliminated, sub-divided, or combined. Additionally, any or all of the example process may be performed sequentially and/or in parallel by, for example, separate processing threads, processors, devices, discrete logic, circuits, and so on.

Figure 6:
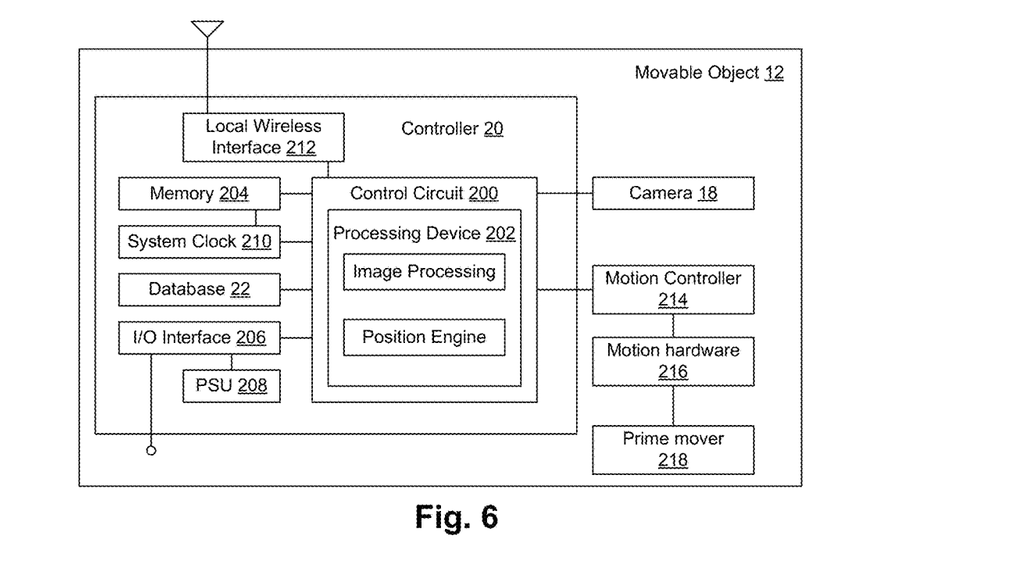
FIG. 6 is a block diagram of an exemplary movable object in accordance with the invention.

The above-described position detection functions may be performed by the controller 20 of the movable object 12, an exemplary block diagram of the movable object being illustrated in FIG. 6. As previously noted, the movable object 12 includes a controller 20 having a position engine configured to carry out the position detection method described herein. A camera 18 is coupled to the movable object 12 and in communication with the controller 20 via a communication link so as to provide image data to the controller 20.

The controller 20 may include a primary control circuit 200 that is configured to carry out overall control of the functions and operations of the controller 20. The control circuit 200 may include a processing device 202, such as a central processing unit (CPU), microcontroller or microprocessor. The processing device 202 executes code stored in a memory (not shown) within the control circuit 200 and/or in a separate memory, such as the memory 204, in order to carry out operation of the controller 20. For instance, the processing device 202 may execute code that implements the position detection function 100. The memory 204 may be, for example, one or more of a buffer, a flash memory, a hard drive, a removable media, a volatile memory, a non-volatile memory, a random-access memory (RAM), or other suitable device. In a typical arrangement, the memory 204 may include a non-volatile memory for long term data storage and a volatile memory that functions as system memory for the control circuit 212. The memory 204 may exchange data with the control circuit 200 over a data bus. Accompanying control lines and an address bus between the memory 204 and the control circuit 200 also may be present.

The controller 20 may further include one or more input/output (I/O) interface(s) 206. The I/O interface(s) 206 may be in the form of typical I/O interfaces and may include one or more electrical connectors. The I/O interface(s) 206 may form one or more data ports for connecting the controller 200 to another device (e.g., a computer) or an accessory via a cable. Further, operating power may be received over the I/O interface(s) 206 and power to charge a battery of a power supply unit (PSU) 208 within the controller 20 may be received over the I/O interface(s) 206. The PSU 208 may supply power to operate the controller 20 in the absence of an external power source.

The controller 20 also may include various other components. For instance, a system clock 210 may clock components such as the control circuit 200 and the memory 204. A local wireless interface 212, such as an infrared transceiver and/or an RF transceiver (e.g., a Bluetooth chipset) may be used to establish communication with a nearby device, such as a radio terminal, a computer or other device. Further the controller 20 may optionally include the database 22 for storing data indicative of anchor points 16, virtual markers 26, 28, and their corresponding positions.

In addition to the controller 20, when the movable object 12 is in the form of an autonomous vehicle or the like it also may optionally include a motion controller 214, motion hardware 216, and prime mover 218 arranged on the support structure, the prime mover 218 being drivingly coupled to the plurality of wheels 12a to effect motion of the movable object 12. The motion controller 214 may receive position data from the controller 20 and, based on the received position data, command the prime mover 218 and the motion hardware 216 to move and steer the movable object 12 to a desired location.

Advantageously, the system, device and method in accordance with the invention provide highly accurate position detection (sub 0.1 mm) with low latency (sub 1 second) while being computationally simple. The solution is simple (a self-contained positioning device) with a minimal need for infrastructure maintenance, is robust against changes in the environment and is non-radio based (so RF interference is not an issue).

Optionally, the system, device and method in accordance with the invention may include multiple image capture devices 18 optimized for visual odometry and anchor point detection. To detect anchor points 16 with a high accuracy it is useful for the image capture device 18 to have a large field of view, and multiple image capture devices 18 could be employed to increase the overall field of view. Additionally, to detect features for visual odometry the image capture device 18 can be optimized to detect as many natural features as possible. This could be achieved using multiple image capture devices 18 or by multiple zoom levels in the same image capture device 18.

Multiple image capture devices 18 could also be advantageously used to decrease error from estimation of rotational movement. However, limiting rotation such is not always practical. To address this problem, two image capture devices 18 (e.g., front and back) can be utilized on the movable object. A majority of the time each image capture device 18 will have a different distance to the movable object's rotation center and, therefore, one image capture device 18 will register less rotation (and thus less error due to rotation) than the other. Advantageously, the image capture device 18 that experiences less rotation can be used to estimate movement, thereby minimizing error due to rotation of the movable object.

In some industrial applications, image capture and subsequent transmission of such images may not be permitted. One way to address this limitation would be to utilize a low-speed hardware interface between the image capture device 18 and the controller 20. Such low-speed interface would enable position date to be transmitted to the controller 20 without significant delay but would not permit image transfer (which is significantly larger than position data). Further, the image capture hardware could be integrated into the movable object 12 to make it difficult to detect its presence, such that only authorized personnel would know the hardware is present.

In one embodiment, to enhance the quality of the captured image artificial lighting may be employed on the movable object 12 so as to provide consistent exposure of the two-dimensional surface 14. Without artificial lighting, there is a risk of low light conditions, which will cause noisy images, particularly, if the image capture device 18 is mounted under a fork lift. Preferably, the artificial lighting includes LED lighting, as it provides sufficient light without consuming significant power. Such artificial lighting will also reduce noise in the captured images.

In one embodiment, the artificial lighting can be turned on for short period of time, mimicking a discharge type flash. In addition to minimizing power consumption, this can decrease motion blur in the images and hence improve performance of the feature extraction and matching algorithms. Additionally, to minimize system cost a fixed-focus camera may be used.

Although the invention has been shown and described with respect to a certain preferred embodiment, it is obvious that equivalent alterations and modifications will occur to others skilled in the art upon the reading and understanding of this specification and the annexed drawings. In particular regard to the various functions performed by the above described components, the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention can have been disclosed with respect to only one of the several embodiments, such feature can be combined with one or more other features of the other embodiments as may be desired and advantageous for any given or particular application.

What is claimed is:

1. A method for determining a position of a movable object on a two-dimensional surface, the method comprising:
    obtaining, via an image capture device attached to the movable object, at least one image of a portion of the two-dimensional surface;
    identifying in the at least one image at least one virtual marker;
    retrieving a previously determined estimated position of the at least one virtual marker, said previously determined estimated position of the at least one virtual marker determined from a combination of
        an image of at least one anchor point on the two-dimensional surface, the at least one anchor point defining a unique, pre-defined position spaced apart from the virtual marker and the position of the movable object on the two-dimensional surface, and
        odometry measurements based on at least two images of the two-dimensional surface;
    determining the position of the movable object on the two-dimensional surface from the estimated position of the at least one virtual marker; and
    sharing the estimated position of the at least one virtual marker with other movable objects operating on the two-dimensional surface.

2. The method according to claim 1, comprising updating the estimated position of the at least one virtual marker based on position data related to the at least one virtual marker from at least one other movable object on the two-dimensional surface.

3. The method according to claim 1, comprising prior to retrieving the previously determined estimated position of the at least one virtual marker,
    identifying at least one image of a plurality of images that includes an anchor point;
    determining an anchor position from the identified image of the anchor point;
    determining the estimated position of the at least one virtual marker based on the anchor position and the odometry measurements.

4. The method according to claim 3, wherein identifying at least one image of the plurality of images that includes at least one virtual marker includes defining the at least one virtual marker from features of the two-dimensional surface.

5. The method according to claim 4, wherein defining the at least one virtual marker from features of the two-dimensional surface includes defining the at least one virtual marker from variations in the two-dimensional surface, or from wear patterns in the two-dimensional surface, or from objects fixed to the two-dimensional surface.

6. The method according to claim 1, wherein the odometry measurements are based on at least two different images of the at least one virtual marker to identify a change in position of the movable object relative to the anchor point.

7. The method according to claim 1, comprising using homography to perform the odometry measurements.

8. The method according to claim 1, wherein each anchor point is encoded with position data that defines a unique two-dimensional position on the two-dimensional surface.

9. A non-transitory computer-readable medium comprising computer executable instructions which when executed by a processor cause the processor to perform the steps according to claim 1.

10. A movable object configured to travel along a prescribed two-dimensional surface, comprising:
    an image capture device; and
    a controller communicatively coupled to the image capture device and operative to receive image data therefrom, wherein the controller is configured to:
    obtain, via the image capture device, at least one image of a portion of the two-dimensional surface;
    identify in the at least one image at least one virtual marker;
    retrieve a previously determined estimated position of the at least one virtual marker, said previously determined estimated position of the at least one virtual marker determined from a combination of
        an image of at least one anchor point on the two-dimensional surface, the at least one anchor point defining a unique, pre-defined position distinct from the virtual marker and a position of the movable object on the two-dimensional surface, and odometry measurements based on at least two images of the two-dimensional surface; and determine the position of the movable object on the two-dimensional surface from the estimated position of the at least one virtual marker.

11. The movable object according to claim 10, further comprising:

a support structure including a plurality of wheels, wherein said image capture device is attached to said support structure; and a prime mover arranged on the support structure and drivingly coupled to the plurality of wheels to effect motion of the movable object.

12. The movable object according to claim 10, wherein prior to retrieving the previously determined estimated position of the at least one virtual marker, the controller is configured to:

identify at least one image of the plurality of images that includes an anchor point;

determine an anchor position from the identified image of the anchor point;

determine the estimated position of the at least one virtual marker based on the anchor position and the odometry measurements; and store the estimated position of the at least one virtual marker.

13. The movable object according to claim 10, wherein the controller is configured to base the odometry measurements on at least two different images of the at least one virtual marker to identify a change in position of the movable object relative to the anchor point.

14. The movable object according to claim 10, wherein the controller is configured to define the at least one virtual marker from features of the two-dimensional surface.

15. The movable object according to claim 14, wherein the controller is configured to define the at least one virtual marker from variations in the two-dimensional surface, from wear patterns in the two-dimensional surface, or from objects fixed to the two-dimensional surface.

16. A system for navigating a movable object on a prescribed two-dimensional surface, comprising:

at least one anchor point arrangeable on the two-dimensional surface, the at least one anchor point including information defining a unique anchor position of the anchor point on the two-dimensional surface; and the movable object according to claim 10.

17. The system according to claim 16, wherein the at least one anchor point comprises at least one of a label attachable to the two-dimensional surface, an image projectable onto the two-dimensional surface, an image painted on the two-dimensional surface, a QR code, a bar code or a natural feature formed on the two-dimensional surface.

18. A system for navigating a movable object on a prescribed two-dimensional surface, comprising:

at least one anchor point arrangeable on the two-dimensional surface, the at least one anchor point including information defining a unique anchor position of the anchor point on the two-dimensional surface; and a plurality of movable objects according to claim 10, wherein each movable object of the plurality of movable objects is configured to share locations of the at least one virtual marker with other movable objects of the plurality of movable objects.

19. A method for defining a position of at least one virtual marker on a prescribed two-dimensional surface, the method comprising:

obtaining, via an image capture device attached to a movable object traveling on the two-dimensional surface, a plurality of images of a portion of the two-dimensional surface;

identifying at least one image of the plurality of images that includes an anchor point that defines a unique, pre-defined position distinct from the virtual marker and a position of the movable object on the two-dimensional surface;

determining an anchor position from the identified image of the anchor point;

defining at least one virtual marker in at least one of the plurality of images;

performing odometry measurements to determine a change in position of the movable object between capture of the image of the anchor point and capture of the image of the at least one virtual marker, and assigning an estimated position to the at least one virtual marker based on the anchor position and the odometry measurements.

* * * * *